Dec. 25, 1934.   D. C. HAY ET AL   1,985,540
TRUCK WHEEL CONSTRUCTION
Filed Dec. 3, 1931   2 Sheets-Sheet 2
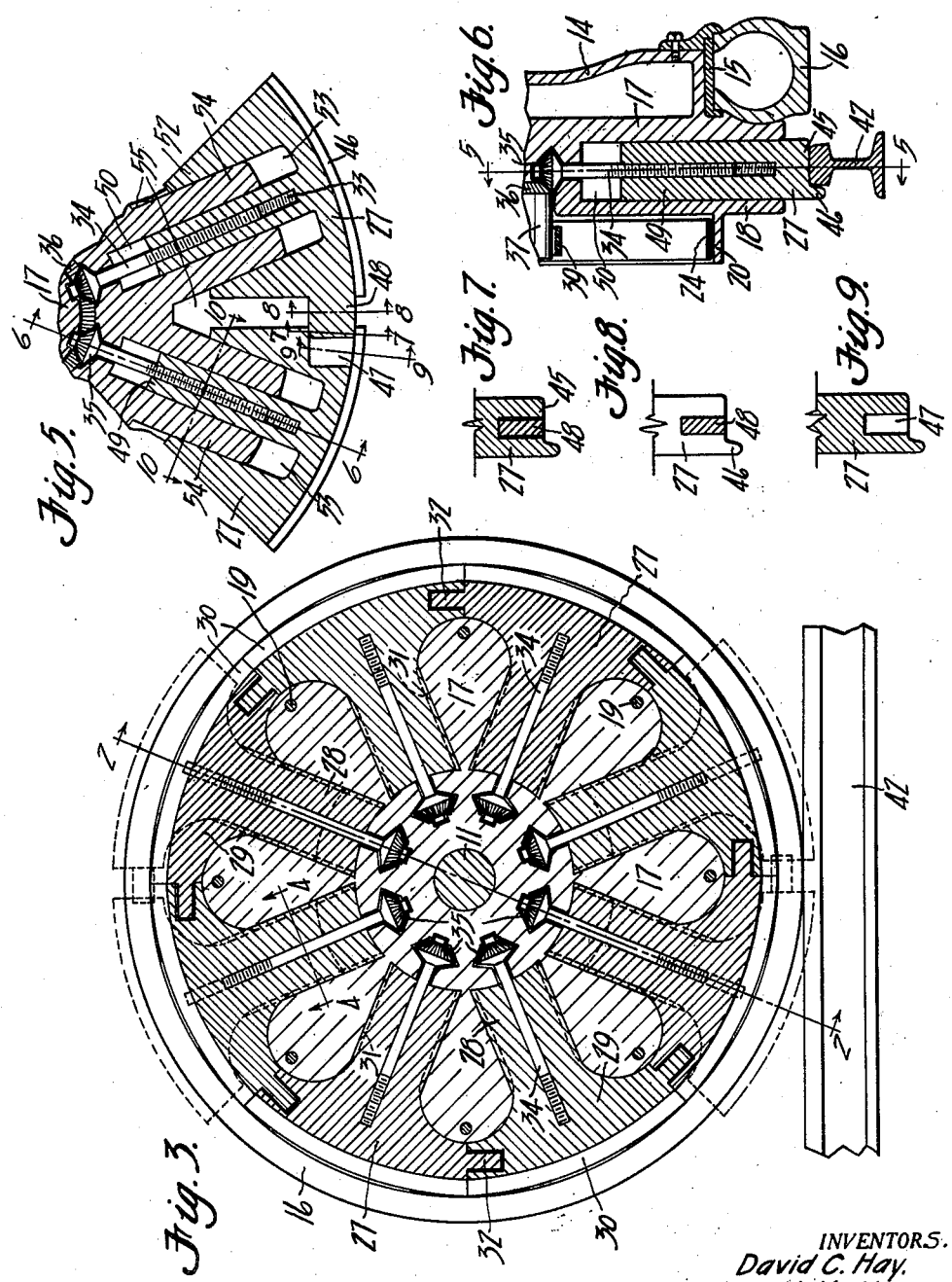
INVENTORS.
David C. Hay.
Lee H. Mattes.
BY
ATTORNEY.

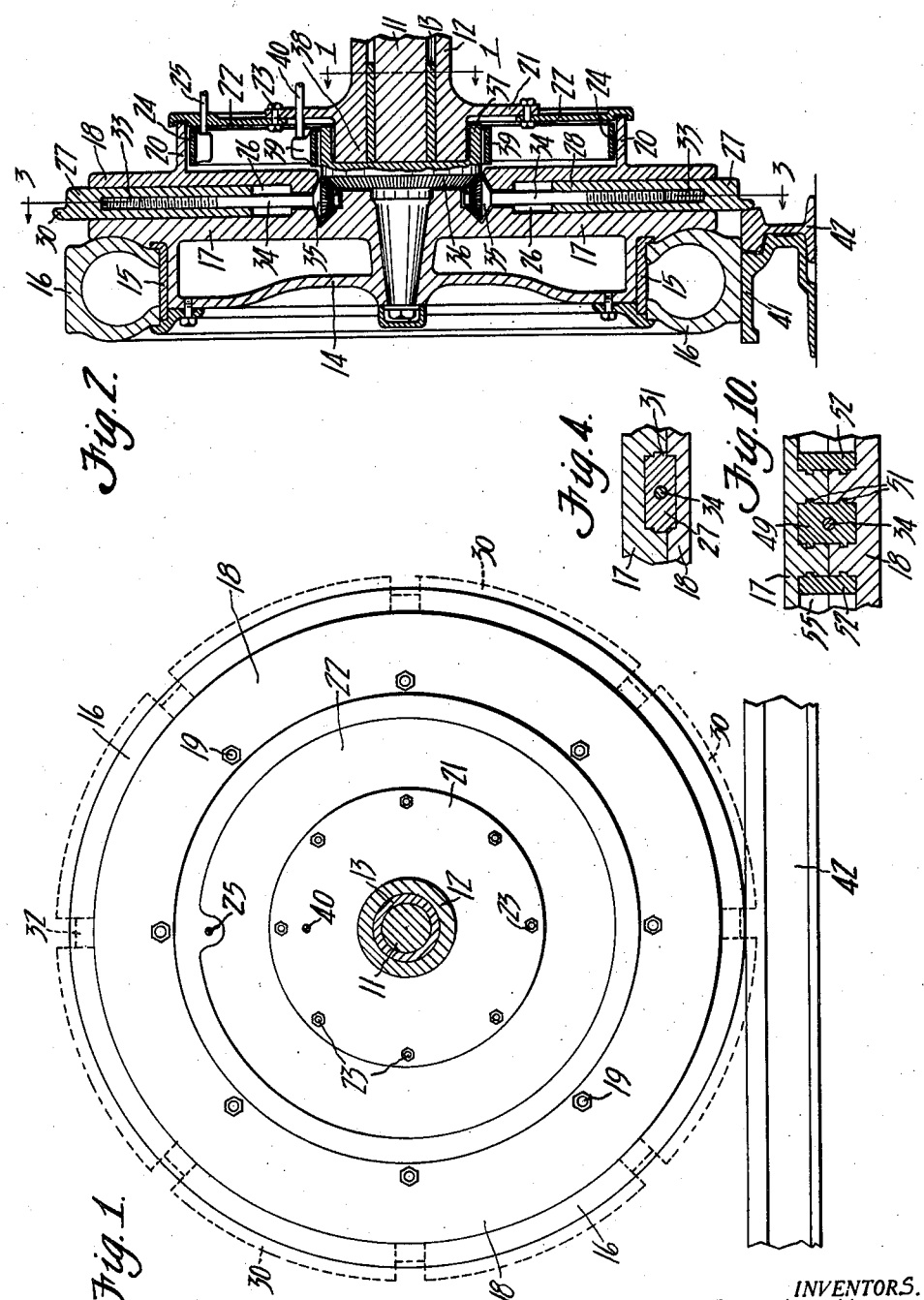

Patented Dec. 25, 1934

1,985,540

UNITED STATES PATENT OFFICE 1,985,540

TRUCK WHEEL CONSTRUCTION

David C. Hay and Lee H. Mattes, South Bend, Ind.

Application December 3, 1931, Serial No. 578,699

24 Claims. (Cl. 295—8.5)

The invention relates to truck wheel constructions, and particularly to the construction of a motor truck wheel by which a motor truck may be selectively and quickly adapted to run upon public roads or upon railroad tracks, whereby motor trucks and trailers are enabled to use railroad right of ways and tracks in traveling between cities or terminal points and to run on public streets and roadways to and from the railroad terminal points and the points of origin and delivery of the goods transported thereby, thus reducing the congested condition of and the danger to passenger traffic on the motor highways, as well as facilitating and more economically permitting the transport of trucked goods for door to door delivery.

The object of the invention is to provide a truck wheel provided with expansible and retractible members adapted upon expansion thereof to engage railroad tracks to permit a truck wheel to run thereon, and retractible when running over paved streets and roads to permit operation of a truck thereon without interference with the truck or damage to the streets or roads.

A further object is to provide a truck wheel of this character having expansible and retractible members selectively operable by movement of the truck.

Other objects of the invention will be apparent from the following description and appended claims, it being understood that changes in the precise embodiment of the invention as illustrated and described may be made within the scope of what is claimed without departing from the spirit of the invention.

In the drawings:—

Figure 1 is an elevation of the inner side of the wheel.

Figure 2 is a radial transverse sectional view of the wheel taken on line 2—2 of Figure 3.

Figure 3 is a sectional view of the wheel taken on line 3—3 of Figure 2, but illustrating the expansible members in retracted position.

Figure 4 is a fragmentary transverse sectional view taken on line 4—4 of Figure 3.

Figure 5 is a fragmentary longitudinal sectional view of a modified construction of wheel taken on line 5—5 of Figure 6.

Figure 6 is a radial transverse sectional view of the modified wheel construction illustrated in Figure 5 and taken on line 6—6 of Figure 5.

Figure 7 is a fragmentary transverse sectional view taken on line 7—7 of Figure 5.

Figure 8 is a fragmentary transverse sectional view taken on line 8—8 of Figure 5.

Figure 9 is a fragmentary transverse sectional view taken on line 9—9 of Figure 5.

Figure 10 is a fragmentary transverse sectional view taken on line 10—10 of Figure 5.

Referring to the drawings, and particularly to Figures 1 to 4 thereof illustrating one embodiment of the invention, the numeral 11 designates a truck axle encased in a housing 12 carrying a bearing 13 in which the axle is journaled. A wheel 14 is mounted on the outer end of the axle 11 and carries a tire rim 15 which mounts a tire 16. A circular plate 17 is integrally formed with the wheel 14 at the back side thereof, and a second circular plate 18 is secured to the rear side of plate 17 by means of bolts and nuts or other suitable securing means 19. The plate 18 forms the outer face plate of a wheel brake, and has integrally formed therewith a circular flange 20 concentric of the axle 11 which forms a brake drum. A circular flange 21 projects horizontally from the housing 12 in spaced relation to the plate 18, and to this flange is secured an inner brake face plate 22 by means of bolts and nuts 23. An internal brake mechanism, including a brake band 24, is mounted in the brake drum 20 and is operable by a rod 25 journaled in the plate 22.

A plurality of equally spaced radial guideways 26 are formed in and between the plates 17 and 18 for the reception of shiftable members 27 which comprise a radially extending stem portion 28 and an outer head portion 29 which carries a flange 30 at its outer edge for purposes to be set forth. Suitable grooves are formed in the opposite sides of the guideways 26 for the reception of guide tongues 31 carried by the opposite sides of the stem portions 28 of the members 27 by which the shifting of the members 27 radially outwardly and inwardly may be guided. The heads 29 of the adjacent shiftable members 27 extend into circumferential interengagement when in retracted position, as illustrated in full lines in Figure 3, and the adjacent sides of said heads are interconnected by interfitting tongues and grooves 32 for purposes to be hereinafter set forth. Each of the shiftable members 27 has a screw threaded bore 33 formed therein extending centrally longitudinally of the stem 28 thereof, and these bores mount screw threaded rods 34. The inner ends of the rods 34 are mounted in suitable openings formed in the plates 17 and 18 and mount bevel gears 35 adapted for rotation in a suitable opening formed in plate 17.

The plate 18 has a central circular opening formed therein whose periphery is spaced outwardly of the bevel gears 35, and in this opening and between the axle housing 12 and plate 17 of the wheel a bevel ring gear 36, with which the bevel gears 35 mesh, is loosely mounted on the axle 11 and adapted for rotation independently thereof. An annular flange 37 is carried by the gear 36 and encircles the outer end 38 of the axle housing 12 to form a second brake drum concentric of and disposed within the brake drum 20. An external brake 39 encircles the drum 37 and is operable by a rod 40 journaled in the axle housing flange 21.

The shiftable members 27 are normally positioned in retracted relation as shown in full lines in Figure 3 whereby the outer edges of the flange 30 thereof are opposite the outer peripheries of the plates 17 and 18 whose radial dimension is slightly less than the radius of tire 16, and when so positioned permit the truck to ride upon the tire 16 without interference therefrom, as for driving on highways and streets. The truck wheel is intended to ride upon railroad tracks, and particularly on tracks of extra width or of the extension rail type illustrated in our copending application, Ser. No. 578,698, filed December 3, 1931, one type of which is illustrated in Figure 2 and comprises an extension rail 41 secured to a conventional rail 42 and cooperating therewith to form a traction surface of a sufficient width to accommodate pneumatic tired truck wheels. The shiftable members 27 are extended when the truck wheels run on such tracks for the purpose of guiding the wheels and keeping them on the track in the same manner as the flange of a conventional train wheel serves this purpose.

In the normal operation of the truck wheel, the ring gear 36 rotates with the wheel and axle, and no relative movement between the ring gear and gears 35 takes place, so that the rods 34 are stationary relative to the shiftable members 27. When it is desired to extend the shiftable members 27, the truck having previously been driven onto the railroad track in desired position, the brake rod 40 is operated to set the brakes 39 and hold the brake drum 37 carrying ring gear 36 stationary with the axle housing. Movement of the truck wheels then rotates the gears 35 relative to ring gear 36 and causes rotation of the threaded rods 34 in their bores 33 to urge all of the shiftable members simultaneously and equally radially outwardly as shown in full lines in Figure 2. When the shiftable members have been fully extended, the brake rod 40 and brake 39 are released, leaving the shiftable members in fixed extended position during subsequent rotation of the wheels.

The tongue and groove connections between adjacent heads 29 of the shiftable members 27 shift, but maintain their interconnection between the shiftable members when the latter are extended, as illustrated in dotted lines in Figure 1; and this interconnection provides a bracing and mutual reinforcing of the heads of the members 27. The outer edges of the heads 29 and the flanges 30 are arcuately formed on a radius taken from the center of the axle to their extended position, and thus when extended, the heads of the shiftable members form an interconnected, though interrupted, circular flange projecting radially beyond the outer periphery of the tire and permits the flanges 30 to engage the inner side of the head of the rail 42 to perform the same guiding function as the flange of a train wheel. The truck may then run on the railroad tracks without danger of jumping them, as it will be seen that the spacing between the adjacent heads 29, when extended, will be so slight that the function thereof is not impaired.

When it is desired to leave the railroad tracks to drive upon a highway, as at a terminal point, the brake 39 is again set by the rod 40, and the truck wheels are moved in the direction opposite that by which the shiftable members were extended. The relative rotation of the gears 35 relative to ring gear 36 will then rotate the rods 34 in their bores to retract the shiftable members into the guideways 26 with their peripheries or outer edges drawn inwardly of the periphery of the tire 16.

It will thus be seen that by this construction a truck wheel is provided which may be selectively provided with a projecting flange adapted to engage a railroad track, which flange is extensible and retractible by rotation of the truck wheels upon setting the brake 39, which may obviously be controlled from the driving compartment of the truck.

In Figures 5 to 10 is illustrated a modified construction of wheel of this character in which all parts of the construction hereinbefore described are employed in their same combined and cooperating relation, but in which the construction of the shiftable members 27 and the guideways in plates 17 and 18 in which the shiftable members operate is modified.

In this modified construction the shiftable members 27 are formed of a width substantially equal to the width of a conventional flanged train wheel to provide a traction surface 45 at the outer periphery thereof which is wide enough to run on the head of a conventional rail 42, and a flange 46 at its inner side to engage the inner side of the rail head. As in the preferred construction, the outer periphery of the portion 45 and flange 46 of each shiftable member is arcuately formed on a radius from the center of the axle to the extended position of said periphery. A groove 47 is formed centrally of the width of each member 27 at the outer edge thereof and at one side thereof. Similarly positioned on the opposite side of each member 27 is a projecting tongue 48 which fits into a groove 47 of the adjacent member 27. The outer edge of each tongue 48 is arcuately curved to form a continuation of the traction surface 45 for purposes to be hereinafter set forth.

The construction of the inner portion of the shiftable members 27 comprises a central radially extending stem 49 slidably fitting in a guideway 50 having grooves in the sides thereof for the reception of tongues 51 extending longitudinally of the sides of said stem. The radial threaded bore 33 for the reception of the threaded rod 34 is formed centrally in the stem 49. Inwardly directed wedge-shaped arms 52 are formed at the sides of the members 27, the outer faces of said arms projecting radially of the wheel, considered in retracted position, and the inner faces of said arms extending in spaced parallel relation to the sides of the stem 49. Guideways 53 are thus formed between the stem 49 and arms 52 for the reception of guide members 54 formed in the plates 17 and 18. Guideways 55 are formed in the plates 17 and 18 for the reception of the arms 52, the opposite sides of said guideways extending parallel to the sides of the adjacent guideways 50.

When the shiftable members are in retracted position, the outer peripheries thereof are positioned opposite the outer peripheries of the plates 17 and 18 in inwardly spaced relation from the periphery of the truck wheel, and thus do not interfere with the running of the wheels on paved roads. The stems 49 fit into the guideways 50, and the arms 52 fit into the guideways 55, and each engages the adjacent arm of the adjacent shiftable member whereby the tongue 48 of one member fits in the groove 47 of the adjacent member. When it is desired to extend the flanges the brake 39 is set to restrain movement of the ring gear 36 and the wheel is moved to produce relative rotation of the gears 35 and ring gear 36, in the same manner as previously described. The shiftable members are thereby equally radially outwardly urged by rotation of rods 34 in their bores 33, the arms 52 following the sides of guide members 54 and moving into spaced relation in guideways 55, as illustrated in Figure 5, whereby only the end of the tongue 48 carried by one of the shiftable members 27 remains in the groove 47 in the adjacent slidable member. In this extended position the traction surfaces 45 of the shiftable members form a continuous circular wheel which rides on the rail 42 and supports the truck, the flange 46 engaging the inner side of the rail head.

The relation of the adjacent slidable members and their tongue and groove interconnection 47, 48, when extended, is illustrated in Figures 5, 7, 8 and 9. The tongue 48 has a close fitting engagement with the upper side of the groove 47 when extended so as to carry the weight of the load carried by the wheel by transmitting it to the adjacent grooved shiftable member 27 when the tongue engages the rail 42 as illustrated in Figure 8, and forms the sole bearing surface of the wheel with the rail. When the portion of the wheel on section 7—7 engages the rail, both the tongue 48 of one shiftable member and the portions of the adjacent shiftable member on opposite sides of the groove 47 thereof ride upon the rail, as shown in Figure 7. And when the portion of the wheel on section 9—9 engages the rail, the portions of the shiftable member on opposite sides of the groove 47 therein ride on the rail, as shown in Figure 9. The traction surface 45 of the wheel is thus continuous. The outer edges of the tongues form continuations of the curvature of the outer peripheries of the slidable members to provide a true circular outer periphery for members 27, which ride on the rail as well as an integral wheel.

Referring again to the construction illustrated in Figures 1 to 4, another feature of this construction resides in the provision of circular plate 17 concentrically of and at one side of tire 16 and above the rail 42. The radius of the plate 17 is slightly less than the radius of the tire 16 when inflated, and substantially greater than the radius of rim 15 of said tire. It will be seen that this construction provides a dual tired wheel which normally runs on tire 16, but which, upon deflation of tire 16, will drop slightly to permit the periphery of plate 17 to run upon rail 42. The danger of jumping the track due to a flat tire is thereby eliminated, and the truck may run on the plate 17 of the one wheel until a suitable repair station is reached without substantial disadvantage and with only slightly lessened speed.

The invention having been set forth, what is claimed as new and useful is:—

1. In combination, an axle, a wheel mounted on said axle, a circular plate concentrically carried by said wheel at one side thereof and of a smaller radius than said wheel, said plate having a plurality of radial guideways formed therein for the reception of shiftable flange carrying members having arcuate outer peripheries, said shiftable members having threaded bores extending radially of said wheel formed therein, threaded rods mounted in said bores, a bevel gear mounted on the inner end of each rod, a bevel ring gear in mesh with said bevel gears mounted on said axle for rotation independently thereof, an annular flange carried by said ring gear, and a brake mechanism for selectively holding said flange and ring gear stationary, whereby rotation of said wheel rotates said bevel gears and rods relative to said ring gear to radially move said shiftable members in the guideways of said plate.

2. In combination, an axle, a wheel mounted on said axle, a circular plate concentrically carried by said wheel at one side thereof and of a smaller radius than said wheel, said plate having a plurality of spaced guideways formed therein for the reception of shiftable flange carrying members having arcuate outer peripheries, said shiftable members having threaded bores extending radially of said wheel, threaded rods engaging said threaded bores, a bevel gear mounted on the inner end of each rod, a bevel ring gear in mesh with said bevel gears mounted on said axle for rotation independently thereof, an annular flange carried by said ring gear, and means for selectively engaging said ring gear flange to hold the ring gear stationary, whereby rotation of said wheel rotates said bevel gears and rods relative to said ring gear to radially move said shiftable members in the guideways of said plate.

3. In combination, an axle, a wheel mounted on said axle, a circular plate concentrically carried by said wheel at one side thereof and of a smaller radius than said wheel, said plate having a plurality of spaced radial guideways formed therein for the reception of shiftable flange carrying members having arcuate outer peripheries, said shiftable members having threaded bores disposed radially of said wheel, threaded rods mounted in said bores, a bevel gear mounted on the inner end of each rod, a bevel ring gear in mesh with said bevel gears mounted on said axle for rotation independently thereof, and means selectively operable to hold said ring gear stationary, whereby rotation of said wheel rotates said bevel gears and rods relative to said ring gear to radially move said shiftable members in the guideways of said plate.

4. In combination, an axle, a wheel mounted on said axle, a plate carried by said wheel at one side thereof with its outer periphery spaced inwardly of the periphery of said wheel, said plate having a plurality of guideways formed therein and extending radially of said axle, a shiftable flange carrying member mounted in each of said guideways having a threaded bore formed therein extending radially of said axle, a threaded rod mounted in each of said bores, a gear carried by the inner end of each of said rods, a ring gear meshing with said first named gears and mounted on said axle for rotation independently thereof, and means selectively operable to hold said ring gear stationary, whereby rotation of said wheel rotates said rods and their gears relative to said ring gear to radially move said shiftable members in the guideways of said plate.

5. In combination, an axle, a wheel mounted on said axle, a plate carried by said wheel having a plurality of spaced guideways formed therein and extending radially of said axle, a shiftable flange carrying member mounted in each of said guideways having a threaded bore therein extending radially of said axle, a threaded rod mounted in each of said bores, a gear carried by the inner end of each of said rods, a ring gear meshing with said first named gears and mounted on said axle for rotation independently thereof, and means selectively operable to hold said ring gear stationary, whereby rotation of said wheel rotates said rods and their gears relative to said ring gear to radially move said shiftable members in said guideways to extended or retracted position, said shiftable members projecting outwardly of said wheel when extended and being spaced inwardly of said wheel when retracted.

6. In combination, an axle, a wheel mounted on said axle, a plate carried by said wheel having a plurality of spaced guideways formed therein extending radially of said axle, a shiftable flange carrying member mounted in each of said guideways, means carried by said axle cooperating with said shifting means, and means controlling said last named means and selectively operable to energize said shifting means through said axle carried means to radially move said shiftable members in said guideways upon rotation of said wheel.

7. In combination, an axle, a wheel mounted on said axle, a plurality of flange-forming members carried by said wheel and shiftable relative thereto, said members being selectively retracted within or projected beyond the outline of the periphery of said wheel, and means for shifting said members to and from retracted and projected positions including means normally rotatable with said wheel, means for holding said normally rotatable means against rotation with said wheel, and means operatively connected with said members and normally rotatable means and energized by relative rotation of said wheel and normally rotatable means for retracting and projecting said members.

8. In combination, an axle, an axle housing, a wheel mounted on said axle, a plurality of flange-forming members carried by and shiftable relative to said wheel, said members being selectively retracted within and projected beyond the outline of the periphery of said wheel, and means for shifting said members to and from retracted and projected positions including means normally rotatable with said wheel, means carried by said axle housing for holding said normally rotatable means stationary, and means connected with said members and normally rotatable means for shifting said members upon rotation of said wheel relative to said normally rotatable means.

9. In combination, an axle, an axle housing, a wheel mounted on said axle, a plurality of flange-forming members carried by and shiftable relative to said wheel, said members being selectively retracted within or projected beyond the outline of the periphery of said wheel, means journaled on said axle housing and normally rotatable with said wheel, a brake carried by said housing for holding said journaled means against rotation, and means operatively connecting said member and journaled means and actuated upon relative rotation of said wheel and journaled means for shifting said members to and from retracted and projected positions.

10. In combination, an axle, a wheel mounted on said axle, a plurality of flange forming members carried by and shiftable relative to said wheel, said members being selectively retracted within or projected beyond the outline of the periphery of said wheel, and selectively operable means energized by the rotation of said wheel for shifting said members to and from retracted and projected positions including means normally rotatable with said wheel and operatively associated with said members, and selectively operable means for holding said normally rotatable means against rotation with said wheel, said normally rotatable means shifting said members to and from retracted and projected positions upon rotation of said wheel relative thereto.

11. In combination, an axle, an axle housing, a wheel mounted on said axle, a member shiftably mounted on said wheel, said member being selectively positioned retracted within or projected beyond the outline of the periphery of said wheel, a gear journaled on said axle housing and normally rotatable with said wheel, means carried by said axle housing for restraining said gear from rotation with said wheel, and means connecting said gear and member for shifting said member to and from retracted and projected positions, said last named means including a gear meshing with said first named gear and actuated thereby upon rotation of said wheel relative to said first gear.

12. In combination, an axle, an axle housing, a wheel mounted on said axle, a member shiftably mounted on said wheel, said members being selectively positioned retracted within or projected beyond the outline of the periphery of said wheel, a sleeve journaled on said axle housing and normally rotatable with said wheel, a gear carried by said sleeve, a brake carried by said axle housing for holding said sleeve and gear against rotation, and means connecting said gear and member for shifting said member to and from retracted and projected positions, said last named means including a gear meshing with said first named gear and actuated thereby upon rotation of said wheel relative to said first gear.

13. In combination, an axle, an axle housing, a wheel mounted on said axle, a member shiftably carried by said wheel, said member being selectively retracted within or projected beyond the outline of the periphery of said wheel, actuating means for said member, and means carried by said axle housing and selectively engageable with said actuating means, said actuating means shifting said member to and from retracted and projected positions upon engagement of said last named means therewith during rotation of said wheel.

14. In combination, an axle, a wheel mounted on said axle, a plate carried by said wheel having a plurality of spaced guideways therein extending radially of said axle, a shiftable flange carrying member mounted in each of said guideways, and means selectively actuating said shifting means to radially move said shiftable members in said guideways upon rotation of said wheel, said last named means including a normally rotatable member whose rotation relative to said wheel is variable, and means for varying the rotation of said rotatable member relative to said wheel.

15. In combination, an axle, a wheel mounted on said axle, a plurality of flange carrying members carried by said wheel and shiftable radially thereof, means guiding the shifting of said members, means for shifting said members, and means for selectively actuating said shifting means to move said shiftable members relative to said wheel upon rotation of said wheel, said last named means including a normally rotatable member whose rotation relative to said wheel is variable and means for varying the rotation of said rotatable member relative to said wheel.

16. In combination, an axle, a wheel mounted on said axle, a plurality of flange carrying members carried by said wheel and shiftable radially thereof, means for shifting said members, and means selectively actuating said shifting means to move said shiftable members relative to said wheel upon rotation of said wheel including a normally rotatable member whose rotation relative to said wheel is variable and means for varying the rotation of said rotatable member.

17. In combination, an axle, a wheel mounted on said axle, a plurality of flange carrying members carried by said wheel and shiftable radially thereof, and selectively operable means energized by rotation of said wheel to radially move said shiftable members relative to said wheel including a normally rotatable member whose rotation relative to said wheel is variable and means for varying the rotation of said rotatable member.

18. In combination, an axle, a wheel mounted on said axle, a plurality of flange carrying members carried by said wheel and shiftable radially thereof, said members having arcuate outer peripheries, sliding tongue and groove interconnections between said members formed at the peripheries thereof, and selectively operable means energized by rotation of said wheel and including a brake for radially moving said members relative to said wheel, said members being extensible beyond the periphery of said wheel and cooperating with each other and with said tongues to form a circular member having a continuous periphery when extended.

19. In combination, an axle, a wheel mounted on said axle, a plurality of flange carrying members carried by said wheel and shiftable radially thereof, said members having arcuate outer peripheries, sliding tongue and groove interconnections between said members formed at the peripheries thereof, and means for radially moving said members relative to said wheel including a member normally rotatable with said wheel and means for varying the rotation of said rotatable member relative to said wheel, said flange members being extensible beyond the periphery of said wheel and cooperating with each other and with said tongues to form a circular member having a continuous periphery when extended.

20. In combination, an axle, a wheel mounted on said axle, a support fixedly carried by said wheel at one side thereof, a plurality of flange-forming members carried by said support and shiftable relative thereto, said members being selectively retracted within or projected beyond the projection of the periphery of said wheel, and selectively operable means energized by the rotation of said wheel and including a brake for shifting said members to and from retracted and projected positions.

21. In combination, an axle, a wheel mounted on said axle, a plurality of flange-forming members carried by and shiftable relative to said wheel, said members being selectively retracted within or projected beyond the outline of the periphery of said wheel, and selectively operable means energized by the rotation of said wheel and including a brake for shifting said members to and from retracted and extended positions.

22. A vehicle having wheels provided with sectional flanges, means normally rotatable with said wheel and operatively connected with said flanges, and means for controlling said last named means to provide a differential of rotation between said last named means and said wheel while said vehicle is in motion and thereby shift said flanges relative to said wheel.

23. A vehicle having a wheel provided with a member shiftable relative thereto, means for shifting said member, and means for actuating said shifting means while said vehicle is in motion including a normally rotatable element whose rotation relative to said wheel is variable and means for varying the rotation of said rotatable member.

24. In combination, a wheel provided with a member shiftable relative thereto, means for shifting said member, and means for actuating said shifting means while said wheel rotates, said last named means including a brake.

DAVID C. HAY.
LEE H. MATTES.